E. H. FORD.
MEANS FOR SETTING METERS.
APPLICATION FILED JUNE 22, 1909.

974,651.

Patented Nov. 1, 1910.

WITNESSES:
L. B. Woerner.
Wm Hurte.

INVENTOR
Edwin H. Ford.
By Minturn & Hoerner
ATT'YS.

UNITED STATES PATENT OFFICE.

EDWIN H. FORD, OF HARTFORD CITY, INDIANA.

MEANS FOR SETTING METERS.

974,651.

Specification of Letters Patent.  Patented Nov. 1, 1910.

Application filed June 22, 1909. Serial No. 503,595.

*To all whom it may concern:*

Be it known that I, EDWIN H. FORD, a citizen of the United States, residing at Hartford City, in the county of Blackford and State of Indiana, have invented certain new and useful Improvements in Means for Setting Meters, of which the following is a specification.

This invention relates to certain means for setting meters, for both gas and water, within the boxes which are let into the ground.

The object of the invention is to provide means whereby meters for both gas and water can be easily and accurately connected and disconnected to and from the service pipes from the top of the meter boxes.

A further object of the invention consists in the provision of means whereby the meters can be disconnected and removed from the boxes without affecting the remaining parts.

A further object of the invention consists in the provision of meter boxes which are small and compact to enable them to be set in an ordinary trench, thereby making additional excavation unnecessary.

The above objects of the invention are accomplished by means of the construction illustrated in the accompanying drawings, forming a part hereof, in which—

Figure 1:
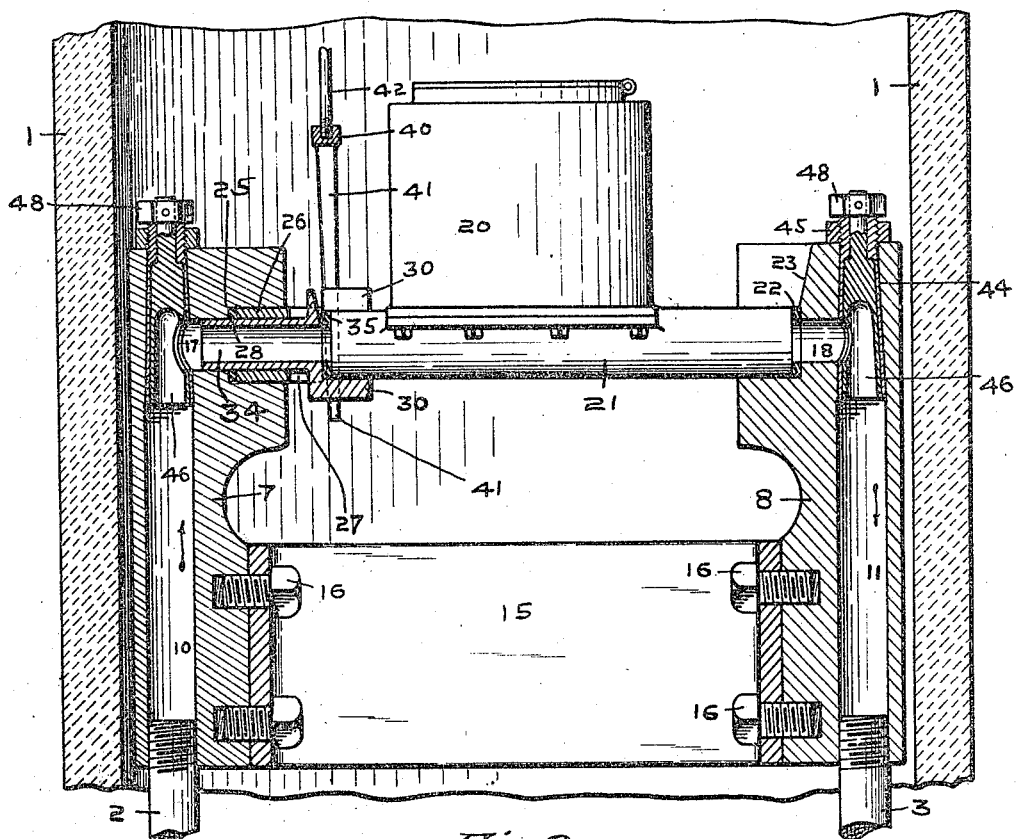
Figure 2:
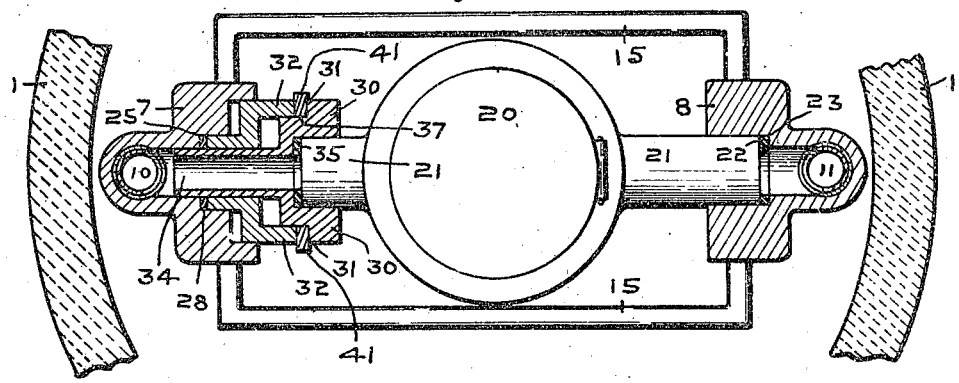

Figure 1 is a detail view in vertical section of a meter box and means for mounting the meter, the latter being shown in elevation. Fig. 2 is a cross section of the construction shown in Fig. 1, the meter being shown in top plan.

In the drawings, 1 represents the casing which forms the body of the meter box; 2 the inlet service pipe, and 3 the outlet service pipe.

Much trouble is experienced in attaching the meters to the ends of the service pipes in the meter boxes in common use, that is, to get them to sit level. Generally, in placing other meter boxes, insufficient excavations are made in order to reduce the expense so that the work in placing the meters is difficult and tedious. To remedy the above difficulties is one of the chief objects of the invention and is accomplished by permitting the connections with the service pipes and the setting of the meters to be made from the top of the meter boxes. These connections are effected by means of the two members 7 and 8 which are provided with the vertical internal passageways 10 and 11. These passageways provide means for conveying the water between the ends of the service pipes and the meter. The lower ends of the passageways 10 and 11 are provided with internal threads which engage corresponding threads on the ends of the service pipes 2 and 3. The threaded connections between the members 7 and 8 and the pipes 2 and 3 enable the outlets to the passageways to be brought to a common level, thereby permitting the meter to be accurately placed in position. The members 7 and 8 are held in rigid relation, after they have been properly adjusted on the ends of the service pipes 2 and 3, by means of the frame 15 securely attached to said members by the bolts 16. The members 7 and 8 are provided with horizontal passageways 17 and 18 which form outlets for the passageways 10 and 11. The meter 20 is interposed between the passageways 10 and 11 from the top of the meter box by a special tool, the latter forming no part of this invention.

The meter is placed into operating position and leakage at the joints is prevented in the following manner: A portion of the member 8 above the passageway 18 is cut away to form an open channel adapted to receive the outlet end of the pipe 21 of the meter 20, and a gasket 22 is interposed between the outlet end of said pipe and the adjacent wall 23 of the member 8, which gasket prevents leakage at this point. The passageway 17 in the member 7 is enlarged as at 25 and receives the hollow sleeve 26 formed on the yoke 27, and a gasket 28 is inserted between the end of the sleeve 26 and the shoulder formed by the enlargement 25. A saddle 30 is provided to support the inlet end of the pipe 21. The saddle is reduced in diameter at 31 so as to permit a portion of the head to project between the guide prongs 32 on the yoke 27, thereby permitting slight longitudinal movement of said saddle within said yoke. The saddle 30 is also provided with the integral hollow sleeve 34 which extends through the yoke 27 and into the passageway 17, and a gasket 35 is inserted between the inlet end of the pipe 21 and the wall at the end of the open channel in said saddle.

It will be noted by examining Fig. 2 of the drawings, that in reducing the diameter of the saddle 30, as at 31, a way 37 is formed on each side—between the head of the saddle and the ends of the guide prongs 32 on the yoke 27. The ways 37 receive a U-shaped key 40, provided with the prongs 41 which are inclined to form a wedge. See Fig. 1. The body of the key 40 is provided with a rod or handle 42 which extends upwardly to the top of the meter box so that the key may be operated from that point. When the key is depressed the wedge-shaped prongs 41 are forced downwardly. This movement of the key forces the saddle 30 and the meter 20 to move toward the right, causing the saddle to compress the gasket 35 tightly against the inlet end of the pipe 21, while the outlet end of said pipe is forced tightly against the gasket 22 in the member 8. This same movement of the key 40, which forces the saddle 30 and the meter 20 toward the right, forces the yoke 27 toward the left, so that the end of the sleeve 26 is forced tightly against the gasket 28. By this simple operation the joints are all sealed and leakage is prevented.

Means is also provided to permit the water or gas service to be established or discontinued. This is accomplished by imparting a conical formation to the upper ends of the passageways 10 and 11. See Fig. 2. Hollow brass sleeves 44, formed so that their exterior surfaces correspond to the conical formations of the internal walls, are inserted into the said passageways, and the said sleeves are provided on the upper exterior surfaces with threads, so that by means of the nuts 45 the sleeves can be tightly drawn into position. The sleeves are provided with outlet openings which communicate with the horizontal passageways 17 and 18 in the members 7 and 8. Valves 46, also formed of brass to permit proper fittings to be made and to prevent rusting, are inserted into the sleeves 44, and these valves are provided at the tops with the nut-heads 48 by which the valves are drawn tightly into the sleeves and also provide the means to enable the valves to be operated. The lower ends of the valves 46 are cupped out, and are provided with openings in the walls which register with the openings in the walls of the sleeves 44. By sufficiently turning the valves 46 to remove the openings in the valves from the openings in the sleeves 44 the service is discontinued, and vice versa.

Having thus fully described my said invention, what I desire to secure by Letters Patent is—

1. A device of the above specified class including the meter box and service pipes, meter supporting means adjustably arranged on the ends of said service pipes and provided with internal passageways for conveying the water or gas between said service pipes and meter, means for securing said supporting means together when adjusted, a meter, and means for securing said meter between said supporting means and in line with the internal passageways.

2. A device of the above specified class including the meter box and service pipes, meter supporting means adjustably arranged on the ends of said service pipes and provided with internal passageways for conveying the water or gas between said service pipes and meter, means for securing the supporting means together when adjusted, a meter, means for securing said meter between the supporting means and in line with the internal passageways, and means adapted to establish or discontinue the water or gas supply through said meter and meter supporting means.

3. A device of the above specified class including the meter box and service pipes, meter supporting means adjustably arranged on the ends of said service pipes and provided with internal passageways for conveying the water or gas between said service pipes and meter, means for securing the supporting means when adjusted, a meter, means for securing said meter between the supporting means and in line with said internal passageways, and means adapted to establish or discontinue the water or gas supply through said meter and meter supporting means.

4. A device of the above specified class including the meter box and service pipes, meter supporting means, provided with recesses to receive the ends of the meter pipes adjustably arranged on the ends of said service pipes and provided with internal passageways for conveying the water or gas between said service pipes and meter, the upper ends of said passageways being formed conically, hollow sleeves adapted to rest within the conically formed ends of said passageways, valves operating within said sleeves to open or close communication through said passageways, and a meter adapted to be interposed between the meter supporting means and in line with said internal passageways.

5. A device of the above specified class including the meter box and service pipes, meter supporting means, provided with recesses to receive the ends of the meter pipes adjustably arranged on the ends of said service pipes and provided with internal passageways for conveying the water or gas between said service pipes and meter, the upper ends of said passageways being formed conically, hollow sleeves adapted to rest within the conically formed ends of said passageways, means adapted to draw said sleeves snugly into said conically formed ends, valves operating within said sleeves to open or close communication through said passageways, and a meter adapted to be interposed between the meter supporting means and in line with said internal passageways.

In witness whereof, I, have hereunto set my hand and seal at Indianapolis, Indiana, this, 29th day of May, A. D. one thousand nine hundred and nine.

EDWIN H. FORD. [L. S.]

Witnesses:
F. W. WOERNER,
L. B. WOERNER.